United States Patent
Muir

[15] 3,667,439
[45] June 6, 1972

[54] TORQUE AND SPEED CONTROL GOVERNOR

[72] Inventor: Earl B. Muir, Palos Verdes Peninsula, Calif.

[73] Assignee: White Motor Corporation, Cleveland, Ohio

[22] Filed: Aug. 7, 1970

[21] Appl. No.: 61,980

[52] U.S. Cl. ..............................123/140 MC, 123/140 FG
[51] Int. Cl. ..........................................................F02d 1/04
[58] Field of Search............123/139, 140, 140 FG, 140 MC; 137/58

[56] References Cited

UNITED STATES PATENTS

| | | |
|---|---|---|
| 3,219,020 | 11/1965 | Roosa..............................123/140.1 |
| 2,364,817 | 12/1944 | Reggio..............................123/140.1 |
| 3,565,047 | 2/1971 | Bulvas..............................123/140 FG |
| 2,910,969 | 11/1959 | Reggio............................123/140.1 X |
| 2,571,842 | 10/1951 | Dale..........................................137/58 |

Primary Examiner—William E. Wayner
Attorney—Smyth, Roston & Pavitt

[57] ABSTRACT

An axially movable governor shaft is acted upon by flyweights in opposition to a force transfer spring and a plurality of torque control springs. The force exerted by the springs is increased or decreased by a fuel pressure differential measured at a variable orifice at the fuel inlet. The position of a servo valve is controlled both by the pressure differential and by the position of the governor shaft to control a flow metering orifice through which fuel to be injected into the engine must pass.

21 Claims, 3 Drawing Figures

INVENTOR
Earl B. Muir

By Smyth, Roston & Pavitt
ATTORNEYS

TORQUE AND SPEED CONTROL GOVERNOR

BACKGROUND OF THE INVENTION

The present invention relates generally to the field of control of internal combustion engines and especially Diesel engines into which fuel is injected for combustion. More particularly, the invention relates to such a governor for use in a system in which the maximum fuel delivered to the engine varies as a function of engine speed so as to produce a desired torque curve or, in other words, a desired relationship between maximum torque and speed.

Many of the torque control governor systems which have been devised basically comprise systems which limit or control the maximum fuel that can be put into an engine as a function of engine speed. Since the amount of fuel injected into an engine determines the torque output of that engine, control of the fuel injection results in control of the shape of the engine maximum torque curve as a function of speed.

In most engine applications, it is normally desired to produce a maximum torque curve which is shaped in a concave fashion so that the maximum fuel injection and maximum torque occur at some speed below the maximum engine speed. If the curve which is characteristic of an engine is formed in this way, an overload placed upon the engine when it is running at maximum speed will not cause the engine to stall or stop running. Instead, the overload will cause a speed reduction and, as the speed drops, the fuel injected into the engine, and therefore the torque provided by the engine, will increase; this utilizes the engine's tendency to lug under the load to produce greater torque to support it or, at least, to reduce engine speed in a gradual rather than sudden fashion.

In one type of torque control governor which has been devised to limit the maximum fuel that can be put into an engine as a function of engine speed, the fuel pressure at a fixed orifice in the injector is controlled. In that system, fuel is delivered under pressure to a cavity between a governor shaft and a piston or servo valve so as to control the size of an orifice through which the fuel passes to the injector by movement of the governor shaft. The fuel in that cavity returns to the fuel source or sump and is then recirculated.

Unfortunately, this system is subject to tampering since, if the line leading from the cavity to the sump is blocked or otherwise obstructed, the increase in pressure in the cavity will result in an increase in the fuel delivered to the injector and, consequently, an increase in engine output torque. However, in most cases this is highly undesirable since it overloads the engine and increases the hydrocarbon and smoke emissions therefrom.

Other types of torque control governors which have been developed utilize a variable orifice to generate a pressure differential which acts through a servo system to control the size of a flow metering orifice. Although these systems operate in a manner which is somewhat similar to the present invention, they require the use of a servo system which is rather complex and expensive due to the large quantity of hardware necessary to accomplish the desired result. These systems also require some external device to act as a speed control governor.

Additionally, these torque control governors are incapable of controlling the engine speed with the structure described. Instead, a separate and distinct governor system must be provided in order to accomplish speed control. In many applications, it is desirable to provide such a speed control governor to control the engine so that, as far as possible, engine speed output is maintained at a relatively constant value. In some speed control governors, engine output speed, which is maintained constant by the governor, can be varied by an operator controlled unit so that speed changes can be made and the governor will maintain any selectable speed desired by the operator.

Engine control systems which require the use of two separate control systems to produce both speed control and torque control have been subject to an inherent instability when engine operation requires a shift of the control from one system to the other. In other words, if the engine is operated at a constant speed so that it is being controlled by the speed governor and a sudden load is applied, the control function is shifted over to the torque control governor. During this period of shifting control, a period of instability occurs during which neither control system has total control and the engine is neither maintaining its constant speed nor producing the required torque.

Most of the prior art engines have required two separate governors—one for speed control and one for torque control—resulting, to some extent, in a duplication of hardware. This factor contributes to the instability during the shift in control from one control system to the other.

SUMMARY OF THE INVENTION

In the present invention, a single governor is provided which produces both torque and speed control. Torque control is provided by the utilization of a flow measuring orifice through which all incoming fuel must pass. The size of the orifice is controlled by a governor shaft acted upon by the pressure differential of the fuel on either side of the orifice, torque control and force transfer springs, and the governor flyweights.

These same forces are imposed upon a servo valve which controls the size of a flow metering orifice through which the injection fuel passes in leaving the governor.

The speed control capability of the governor is provided by the use of a sliding sleeve, containing the flow measuring orifice, which may be manually adjusted by the engine operator so as to position the flow measuring orifice relative to a shutoff shoulder on the governor shaft. Movement of the governor shaft as a function of engine speed will tend to alter the size of the measuring orifice and, therefore, the fuel flow.

In an alternate embodiment, a pair of centrifugal force actuated governor weights also control the torque and speed in a single unit. The torque control weight unit is acted upon by a pressure differential on the opposite sides of a flow measuring orifice and a set of torque control springs. The speed control governor is acted upon by a throttle shaft which may be positioned so as to control a spring force tending to bias the speed control governor flyweights against the centrifugal force acting thereon.

In both of these embodiments, a single governor system is used to control both torque and speed, and a minimum of hardware, and therefore cost, is required to produce a completed governor. Further, both control systems in each of the embodiments are in simultaneous operation so that no shifting of control from one governing device to the other takes place at any stage of operation and the engine is under constant control with no condition of instability.

Basically, the torque control system of the present invention comprises five fundamental elements which, together, produce the desired effects.

A flow measuring orifice in the governor receives all fuel passing through the fuel pump and a pressure differential is generated at the orifice which is proportional to the volume of flow. This pressure differential is imposed upon a servo system to control the quantity of fuel delivered to the fuel injector. It should be understood that these governors may be used with engines having either direct injection systems or fuel pumps and, hereafter, the words "injector" and "fuel pump" shall be used interchangeably with no limitation to one or the other being intended thereby.

A governor flyweight-shaft apparatus in the torque control system generates a force which is proportional to the square of the operating speed. This force is modified and fed to a servo valve to produce a signal which regulates the quantity of fuel passed to the injector as a function of engine speed.

One or more force transfer springs connect the governor shaft to the servo valve and transmit the force of the governor to the servo. The deflection of the spring is proportional to the force imposed by the governor shaft. As engine speed increases, the deflection of the spring tends to increase due to the increased governor force output. Conversely, as engine speed decreases, the spring deflection also tends to decrease. In this manner, the governor flyweights move as a function of the engine speed and, therefore, the force delivered to the servo valve from the governor shaft regulates the quantity of fuel to the injector as a function of engine speed.

One or more governor torque control springs are also utilized to alter the governor force output as a function of engine speed, thereby producing a force, during certain portions of the engine speed range, which is not directly proportional to the square of the engine speed. These torque control springs may be utilized to either add to or subtract from the governor force which is applied to the servo valve.

A servo system, to which the governor force and the pressure differential are applied, controls the total fuel flow to the injector by regulating a metering orifice. Under the influence of the pressure differential signal and the modified governor output force signal, the servo system positions itself to produce a flow metering orifice area which provides the necessary inlet flow at the flow measuring orifice to produce the desired operating speed.

Other advantages, objects, modes, and embodiments of this invention will be understood by reference to the detailed description and accompanying drawing which illustrate what are presently considered to be preferred embodiments of the best mode contemplated for utilizing the novel principles of the invention as set forth in the claims.

DETAILED DESCRIPTION

Figure 1:
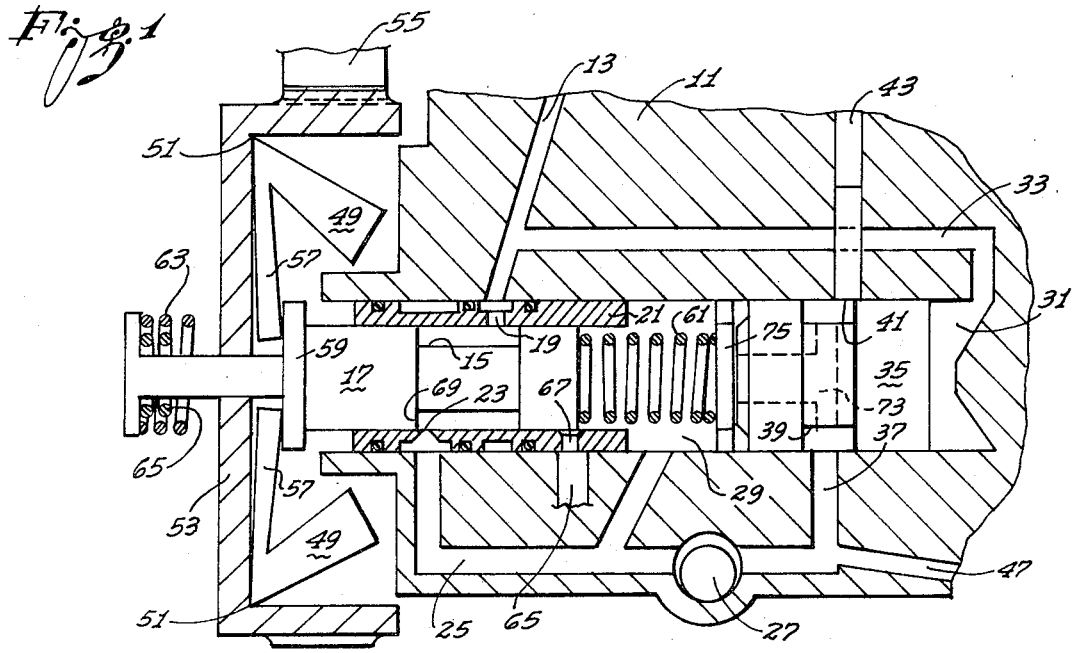
FIG. 1 is a schematic, sectional illustration of a preferred embodiment of a governor in accordance with the present invention.

As shown in FIG. 1, a preferred embodiment of the engine control system according to the present invention comprises a housing 11 having an input fuel passage 13. The fuel in the passage reaches a chamber about an annulus 15 on a governor shaft 17 by passing through a groove and passage 19 of a slidable sleeve 21. The fuel then passes through a flow measuring orifice 23 in the sleeve 21 and enters a passage 25 through which it is delivered to a transfer pump 27 and a first pressure differential chamber 29.

Fuel in the passage 13 is also delivered to a second pressure differential chamber 31 by means of a passage 33. In this manner, fuel on the input side of the flow measuring orifice 23 is delivered to chamber 31 and fuel which is passed through the orifice is delivered to chamber 29. Between these chambers, a movable servo valve 35 is positioned so that fuel leaving the pump 27 moves through a passage 37, around an annulus 39 in the servo valve 35, through a flow metering orifice 41, and to the injection device (not shown), via a line 43, through which fuel is injected for combustion into the engine. Fuel leaving the pump 27 may also pass through a passage 47 through which it is directed to an injection timing apparatus (not shown) so as to control the injection timing of the fuel delivered to the injector, if desired.

The servo valve 35 is thus acted upon by fuel in the chambers 29 and 31 in accordance with a pressure differential between the fuel in each of these chambers generated by the flow measuring orifice 23.

The servo valve is also acted upon indirectly by a set of flyweights 49 which pivot about points 51 in response to rotation of the flyweights together with a governor carrier 53 which is driven by a gear 55 powered by the engine.

As the flyweights 49 are rotated, centrifugal force acting thereon will cause them to pivot about points 51 so that the lever arms 57 thereof will act against a shoulder or collar 59 on the governor shaft 17 to drive it to the right, as viewed in the figure. This force will be transmitted to the servo valve 35 via a force transfer spring 61 which aids in urging the servo valve toward the right. As the engine speed increases, causing the governor shaft 17 to move further to the right, a set of torque control springs 63 and 65 will sequentially enter into contact with the governor carrier 53 so as to further aid in counteracting part of the governor force exerted on the servo valve. While the torque control springs have been illustrated as a pair of springs having different lengths, it should be appreciated that more than two springs or a variable spring could be used to accomplish this function.

The slidable sleeve 21 may be moved axially by means of a shaft 65 which has a small eccentric 67 at its end projecting into the sleeve. As the shaft is rotated by the engine operator, the eccentric tends to slide the governor sleeve either to the right or to the left so as to adjust the position of the flow measuring orifice 23 relative to an orifice controlling shoulder 69 on the governor shaft.

Transfer pump 27 is placed in the system so as to increase the pressure on the downstream side of the flow measuring orifice 23 to the level required to properly fill the high pressure pumping element of the fuel injector. Since this pump must be of such a size as to deliver the greatest volume of fuel which might ever be required during operation of the engine, under normal conditions its capacity will be greater than that required and a relief valve must be utilized to dump excess fuel leaving the pump to avoid excessive pressure levels. This could be accomplished by the installation of a check valve between the passages 25 and 37. As an alternative, however, a passage 73 in the servo valve is in communication with the area about the annulus 39 so that fuel at excessive pressure can move through the passage 73 and past a plate valve 75 at the end of the servo valve. Since the plate valve is directly contacted by the force transfer spring 61, the pressure within the annulus 39 is controlled as a direct function of the force being exerted through this spring. As a result, the transfer pump output pressure is effectively a function of engine speed squared, as controlled by the governor force, and that pressure required to fill the high pressure element of the fuel pump or injector.

In operation, the governor functions in slightly different manners depending on the operating speed of the engine. First, the operation will be considered in the case in which the engine has been lugged down below the desired speed and is therefore operating along a torque curve such as that illustrated in FIG. 3.

When the engine is operating along the torque curve and is controlled totally by the torque control device, the governor shaft 17 will have moved to the left, as viewed in the drawing, with respect to the slidable sleeve 21 and the flow measuring orifice 23 will be wide open. Fuel will pass through passage 13 and groove and passage 19 into the area about the annulus 15. As the fuel reaches the flow measuring orifice 23, a pressure differential will be generated on opposite sides of the orifice, resulting in a similar pressure differential being exerted on opposite sides of the servo valve 35. In other words, the higher pressure will be exerted in chamber 31 and the lower pressure will be exerted in chamber 29. This pressure differential will vary approximately as the square of the flow passing through the orifice 23. Therefore, the pressure drop across the orifice is the measure of the flow passing into the injection system and is used by the servo valve 35 to meter the proper quantity of fuel to the engine.

In view of the pressure differential between the fuel in the chamber 29 and 31, the larger pressure in chamber 31 tends to move the servo valve 35 to the left, as viewed in the drawing, to close the flow metering orifice 41. In opposition to this force, the governor force, as modified by the torque control springs, when they are effective, and the force exerted by the fuel in chamber 29 are applied to the left side of the servo valve, tending to move it toward the right, i.e., to open the metering orifice 41. Therefore, the servo valve will seek a position at which a balance between the applied governor force and the pressure differential force is attained.

An increase in the flow of fuel through the orifice 23 will result in an increase in the pressure differential across the orifice. This will result in a greater differential pressure being exerted on the servo valve 35 so that the increased pressure in chamber 31 and the reduced pressure in chamber 29 results in an imbalance with the applied governor force causing servo valve 35 to move in a direction in which the effective size of the metering orifice 41 is continuously reduced, thereby reducing the fuel flow and increasing the pressure differential, until the forces are again in balance. The servo valve will then remain in the new position until such time as the pressure differential again changes.

If the flow through the measuring orifice 23 is reduced, the pressure differential in the chambers 29 and 31 will also become reduced and the applied governor force will overcome a portion of the pressure differential and tend to move the servo valve to the right. This, of course, tends to open the flow metering orifice 41, increasing the fuel flow and decreasing the pressure differential until a balance is once again achieved.

It should be noted that when the engine is lugged down below the desired speed and is operating on the torque curve, the flow measuring orifice 23 is wide open, as shown in FIG. 1.

Figure 3:
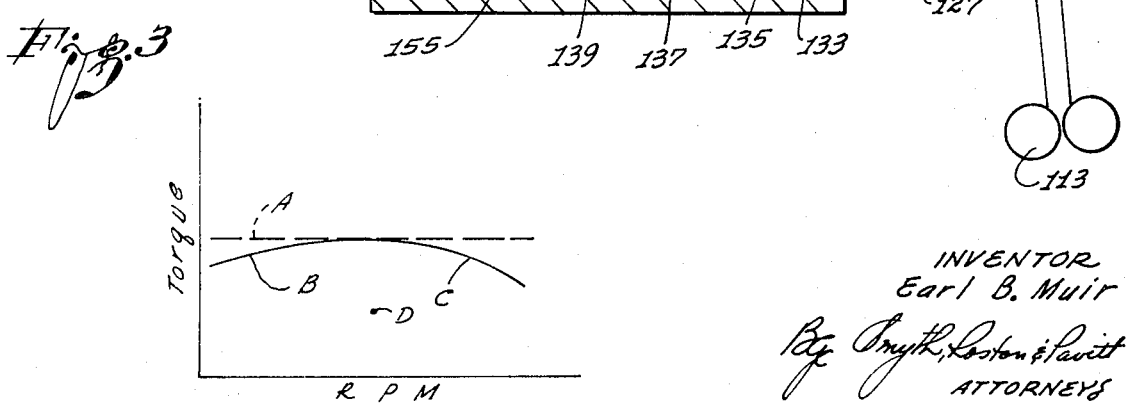
FIG. 3 is a graph illustrating the desired torque curve, or relationship between maximum torque and speed.

Referring now to FIG. 3, a graph has been illustrated showing the relationship between maximum torque and engine speed (rpm). The dashed line designated A indicates the maximum torque which would be produced by an engine controlled by the governor shaft 17 with no force absorbing springs utilized to absorb any of the governor force. In other words, in this case, governor force would always be directly proportional to engine speed squared. A torque curve of this nature would usually be highly unsatisfactory since, if a large load were applied to the engine when the engine was running at maximum speed, it would stall out and come to a stop very quickly.

The line designated B–C, however, illustrates a more desirable maximum torque curve since, if a load is applied to the engine while it is running at maximum speed, a greater amount of torque will be provided as the engine slows down so that its tendency to stall will be reduced or, at worst, effectively controlled.

The portion of the line B–C designated B is brought about by the use of force transfer spring 61 which allows the governor shaft 17 to move to the right, as the governor weight force increases with an increase in speed, at a rate greater than that which servo valve 35 moves to the right. As the engine speed increases, the governor weights 49 swing outwardly about points 51, thereby causing an increase in the radius of each weight's center of gravity about the axis of shaft 17. As a result of the increase in radius, governor force increases at a rate greater than engine speed squared.

In other words, since spring 61 effectively produces lost motion between shaft 17 and valve 35 so that a relatively large movement of the shaft results in only a relatively small movement, if any, of the valve, precise and accurate positioning of the valve relative to orifice 41 can be produced at the same time that the radius of each weight's center of gravity is increased a relatively large amount. Therefore, engine torque or power increases as engine speed increases, by allowing more fuel to pass through orifice 41, resulting in a curve such as that designated as B of line B–C in the graph.

The portion C of the line B–C is brought about by the use of the torque control springs 63 and 65 which come into effect only after a predetermined engine speed has been reached, i.e., shaft 17 has been moved a predetermined amount to the right, and act to decrease the amount of fuel passing through the metering orifice 41, thereby decreasing torque, by absorbing some of the governor force at the higher speeds so that proportionally smaller positioning force will be exerted on valve 35. Thus it will be understood that the shape of the torque curve can be very closely controlled by the selection of the force transfer and torque control springs. For example, the upper portion of the curve may be controlled in such a way that the maximum torque occurs at the speed at which spring 63 begins to exert a force on the shaft 17.

Now, considering the second type of operation in which the engine is operating at a governed speed at a torque which is less than maximum torque for that speed, such as indicated at point D in the graph of FIG. 3, it is to be recalled that the position of the sleeve 21 may be controlled by the operator by means of the shaft 65 and eccentric 67 to preset the governor speed. As the engine speed increases, as may happen when the load is reduced, the governor shaft 17 begins to move toward the right due to the increase in the centrifugal force applied to the flyweights 49 by the additional rotational speed. Since the governor shaft tends to move to the right, when shoulder 69 reaches the periphery of orifice 23 it will begin to close off the orifice and effectively decrease its size. As the size of the measuring orifice 23 is reduced, the pressure differential across servo valve 35 is increased until it reaches a differential such that orifice 41 has been reduced in size to produce the proper flow rate to the injectors to maintain the desired engine speed. As the speed increases further, perhaps due to a further decrease in engine load, the governor shaft 17 will move further toward the right until, if necessary, the orifice 23 is completely closed by the shoulder 69. When this occurs, all fuel flow to the fuel pump or injector is completely stopped because the orifice 23 is closed and the pressure differential across servo valve 35 will become great enough to close orifice 41.

Thus it will be seen that when the engine is operated at a speed which causes the shoulder 69 on the governor shaft 17 to be positioned so as to be adjacent to the periphery of and partially block the measuring orifice 23, the engine will operate at substantially a constant speed. If the speed should increase slightly, the governor shaft will move to reduce the size of orifice 23, thereby increasing the pressure differential to reduce the orifice 41, thereby reducing fuel flow and engine speed; if engine speed should decrease, the shaft will withdraw the shoulder from at least a portion of the orifice 23, thereby allowing orifice 41 to be enlarged to increase the fuel flow to the engine. As a result, the governor not only operates as a torque control system, but also as a constant speed system for the engine controlled. Additionally, since both systems are controlled by orifice 41, there is no shift from a torque control system to a constant speed system there can be no instability of operation regardless of the type of changes in operating conditions which the engine undergoes or the speed with which they occur.

Figure 2:
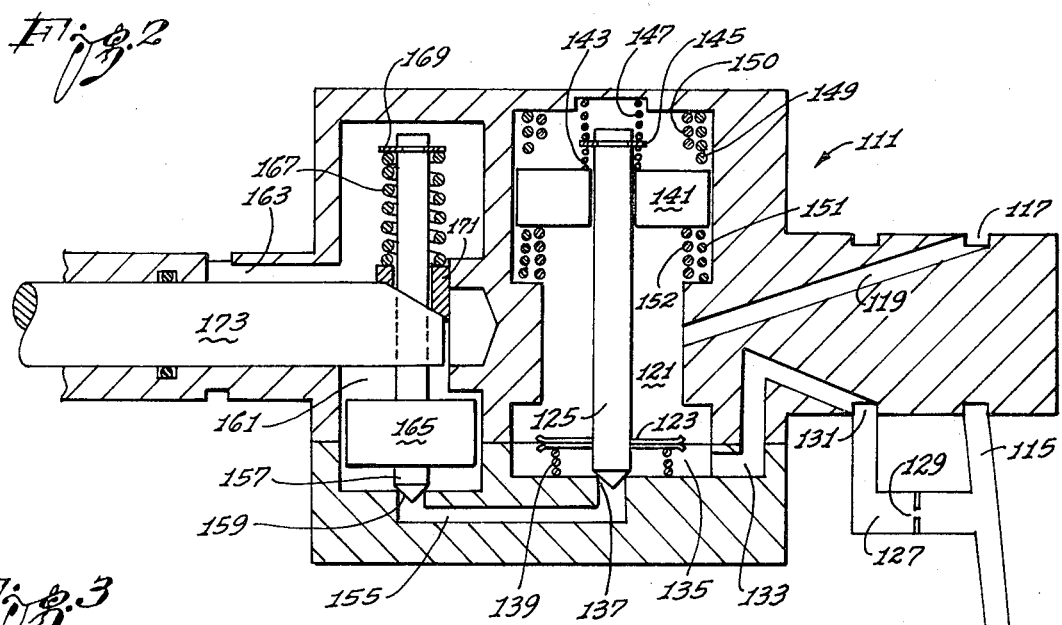
FIG. 2 is a similar illustration of an alternate embodiment of the present invention.

Referring now to the embodiment shown in FIG. 2, a governor element 111 has been shown without a housing for the sake of simplicity. In this embodiment a pump 113 delivers fuel to a first passage 115 through which it is transferred to a groove 117 in the rotatable governor element 111. The fuel then passes through a passage 119 and into a chamber 121, one end of which is sealed off by a diaphragm 123 which is fixed to a torque governor shaft 125.

Fuel from the pump also passes through a passage 127 having a flow measuring orifice 129 therein and into a groove 131 in the governor element. The fuel in the groove 131 then passes through a passage 133 and into a chamber 135 formed on the opposite side of the diaphragm 123. Thus, the fuel in chamber 121 acting upon the diaphragm 123 tends to move the governor shaft 125 to a position in which a fuel metering orifice 137 is closed by an end of the shaft. On the other hand, fuel in the chamber 135 tends to open the orifice 137. Since the pressure in chamber 121 is greater than the pressure in chamber 135 as a result of the pressure differential across the flow measuring orifice 129, the pressure differential will tend to maintain the orifice 137 in the closed condition.

A biasing spring 139 within the chamber 135 tends to open the orifice 137 so that over-fueling can be accomplished when the engine is being started.

A torque governor weight 141 is slidably movable relative to the opposite end of the governor shaft 125 so that a governor force transfer spring 143, acting against a collar or shoulder 145 fixed on the governor shaft, tends to open the orifice 137, due to the centrifugal force exerted on the weight when the governor element 111 is rotating.

Biasing spring 147 and torque control springs 150-152 act on the governor weight 141 in ways which may be determined by spring rate, length, etc., so as to shape the torque curve in a variety of ways, each fitting a specific engine use.

Thus, the fuel pressure differential on the opposite sides of the diaphragm 123 and the centrifugal force acting against the weight 141 may, if properly selected, produce an essentially identical torque curve (FIG. 3) as the structure illustrated in the embodiment of FIG. 1, insofar as the torque control function is concerned.

When fuel passing through the passage 133 and chamber 135 moves past the governor shaft and through the flow metering orifice 137, it enters a passage 155 and passes through an orifice 159, a chamber 161 and a passage system 163 to the fuel pump or injector.

A speed governor weight 165 fixed on the shaft 157 tends to drive the shaft to a position in which the orifice 159 is closed when the element 111 rotates. This movement of the weight and shaft are resisted by a spring 167 acting between a shoulder or collar 169 fixed to the shaft and a movable collar 171. The position of the collar 171, and thus the control of the biasing force exerted by spring 167, is axially adjustable by means of a throttle shaft 173 which is moving along its own axis so that complementary inclined surfaces on the shaft 173 and collar 171 will cooperate to move the collar.

In this manner, the speed control shaft 157 produces an identical result as the cooperation of shoulder 69 and orifice 23 in the embodiment of FIG. 1 and the throttle shaft 173 produces the same result as does the shaft 67 and sleeve 121.

In other words, spring 167 will exert a force against the shaft 157 to drive it outwardly in opposition to the force exerted by the weight 165. If the engine speed should increase, the increased force of weight 165 will tend to close the orifice and reduce the amount of fuel delivered to the engine.

Thus it can be seen that in both of the described embodiments, the engine torque and speed can be very accurately controlled with a minimum amount of hardware which is simple in nature and with no instability in engine operation when the control thereof is shifted between the speed and torque control systems.

With this disclosure, the applicant has provided two embodiments of a new and improved concept in the engine control art which yield a true advancement in that art.

Many further embodiments, modifications, and alterations of these embodiments will be obvious to those skilled in the art, without departing from the scope afforded by the invention as defined in the claims; wherefore, what is claimed is:

1. A governor for controlling the operation of an engine comprising
   a movable governor shaft,
   a centrifugal force-actuated weight system acting on said governor shaft,
   means for passing all of the fuel to be injected into the engine through the governor,
   means for measuring the volume of fuel flowing through said fuel passing means and for generating a flow rate signal in response thereto,
   means for metering the fuel passing from the governor to the engine in response to the fuel flow signal generated by said measuring means, and
   means interconnecting said governor shaft and said metering means for adjustment of said metering means in accordance with the speed of the engine, including
   means for varying the adjustment of said metering means by said governor shaft in accordance with a predetermined relationship between the volume of fuel flowing through said measuring means and the speed of the engine.
2. The governor of claim 1 including
   means on said governor shaft for controlling the volume of fuel passing through said measuring means.
3. The governor of claim 1 including
   means for manually adjusting the volume of fuel which can flow through at least one of said measuring means and said metering means in accordance with a predetermined engine speed.
4. The governor of claim 1 wherein
   said governor shaft includes
      means for altering the flow through said measuring means in accordance with a predetermined desired engine speed.
5. The governor of claim 1 wherein
   said governor shaft includes
      means for altering the flow through said metering means in accordance with a predetermined desired engine speed.
6. The governor of claim 1 wherein
   said means for measuring fuel flow includes
      a sleeve member movable relative to said governor shaft and having
         a pressure differential generating orifice therein.
7. The governor of claim 6 wherein
   said governor shaft includes
      means for altering the effective size of said pressure differential generating orifice in accordance with a predetermined desired engine speed.
8. The governor of claim 7 including
   means for moving said sleeve member relative to said governor shaft so as to control the volume of fuel which will flow through said orifice, prior to reduction of the size of said orifice by said altering means, and thereby control the speed of the engine.
9. The governor of claim 6 wherein
   said governor shaft includes
      means for altering the said metering means to control fuel flow in accordance with a predetermined desired engine speed.
10. The governor of claim 1 wherein
    said means for metering fuel flow to the engine includes
       a metering orifice in said passing means and
       valve means for altering the effective size of said metering orifice.
11. The governor of claim 1 wherein
    said measuring means includes
       fuel pressure differential means for causing a first pressure and a second pressure to be generated in the fuel in said passing means and
    said metering means includes
       a metering orifice in said fuel passing means and
       a valve means for altering the effective size of said metering orifice in response to fuel at the first pressure acting to enlarge the effective size of said metering orifice and fuel at the second pressure acting to reduce the effective size of said metering orifice.
12. The governor of claim 11 wherein
    said adjustment varying means includes
       at least one biasing member for reducing the adjustment force exerted by said governor shaft on said metering means.
13. The governor of claim 11 wherein
    said adjustment varying means includes
       a force transfer spring intermediate said governor shaft and said valve means for transmitting an adjustment force to said valve means from said governor shaft.
14. The governor of claim 13 wherein
    said adjustment varying means further includes
       at least one biasing means associated with said governor shaft for reducing the adjustment force transmitted through said force transfer spring only after the engine has attained a predetermined speed.
15. The governor of claim 14 including
    means for altering the differential between the first and second pressures in response to a change in engine speed.
16. The governor of claim 11 wherein said adjustment varying means includes
   lost motion means such that said governor shaft can move a large distance relative to said valve means.

17. The governor of claim 1 wherein
said means for measuring fuel flow includes
   a pressure differential generating orifice in said passing means
   a pressure differential sensing means fixed to said governor shaft, and
   fuel passage means connecting a first side of said orifice to a first side of said sensing means and connecting the second side of said orifice to the second side of said sensing means.

18. The governor of claim 1 wherein
said means for metering fuel flow to the engine includes
   an orifice in said passing means and
   valve means integral with said governor shaft for altering the effective size of said orifice.

19. In an engine governor having a centrifugal force-actuated governor shaft, the improvement comprising
   means for passing fuel to be injected into said engine through said governor,
   means within said passing means for creating a pressure differential as a function of the volume of the fuel passing through said governor,
   means for sensing the pressure differential generated by said creating means,
   means for metering the fuel passing from said governor to said engine,
   means for adjusting said metering means in accordance with the centrifugal force exerted on said governor shaft and the pressure differential sensed by said sensing means,
   first means for modifying the adjustment force exerted by said governor shaft on said adjusting means so as to provide a predetermined maximum volume of fuel to said engine at each possible engine speed within a first range of engine speeds, and
   second means for modifying the amount of adjustment force exerted by said governor shaft on said adjusting means so as to provide a predetermined maximum volume of fuel to said engine at each possible engine speed within a second range of engine speeds.

20. A governor for controlling the operation of an engine comprising
   a movable governor shaft,
   a centrifugal force-actuated weight system acting on said governor shaft,
   means for passing fuel through the governor to be injected into the engine,
   means for measuring the fuel flowing through said fuel passing means and for generating a flow rate signal in response thereto including
      a sleeve member movable relative to said governor shaft and having
         a pressure differential generating orifice therein,
   means operatively associated with said governor shaft for altering the effective size of said pressure differential generating orifice in accordance with a predetermined desired engine speed,
   means for moving said sleeve member relative to said governor shaft so as to control the volume of fuel which will pass through said orifice, prior to reduction of the size of said orifice by said altering means, and thereby control the speed of the engine,
   means for metering the fuel passing from the governor to the engine in response to the fuel flow signal generated by said measuring means, and
   means interconnecting said governor shaft and said metering means for adjustment of said metering means in accordance with the speed of the engine, including
      means for varying the adjustment of said metering means by said governor shaft in accordance with a predetermined relationship between the volume of fuel flowing through said measuring means and the speed of the engine.

21. A governor for controlling the operation of an engine comprising
   a movable governor shaft,
   a centrifugal force-actuated weight system acting on said governor shaft,
   means for passing fuel through the governor to be injected into the engine,
   means for measuring the fuel flowing through said fuel passing means and for generating a flow rate signal in response thereto including
      a sleeve member movable relative to said governor shaft and having
         a pressure differential generating orifice therein,
   means for metering the fuel passing from the governor to the engine in response to the fuel flow signal generated by said measuring means,
   means on said governor shaft for altering said metering means to control fuel flow in accordance with a predetermined desired engine speed, and
   means interconnecting said governor shaft and said metering means for adjustment of said metering means in accordance with the speed of the engine, including
      means for varying the adjustment of said metering means by said governor shaft in accordance with a predetermined relationship between the volume of fuel flowing through said measuring means and the speed of the engine.

* * * * *